United States Patent [19]

Galantay

[11] 3,911,021

[45] Oct. 7, 1975

[54] 1-ALKOXY-1-ARYL-2,3-BUTADIENES

[75] Inventor: Eugene E. Galantay, Liestal, Switzerland

[73] Assignee: Sandoz, Inc., E. Hanover, N.J.

[22] Filed: Jan. 14, 1974

[21] Appl. No.: 432,833

[52] U.S. Cl.... 260/611 A; 260/613 R; 260/247.7 A; 260/571; 260/293.83; 260/268 PH; 260/326.87; 260/326.5 N; 260/239 BC; 424/339; 424/248; 424/250; 424/256; 424/274; 424/325

[51] Int. Cl.$^2$............................................ C07C 43/20

[58] Field of Search..................... 260/611 A, 613 R

[56] References Cited
FOREIGN PATENTS OR APPLICATIONS 2,258,349   6/1973   Germany............................ 260/618

*Primary Examiner*—Bernard Helfin
*Attorney, Agent, or Firm*—Gerald D. Sharkin; Richard E. Vila; Frederick H. Weinfeldt

[57] ABSTRACT

Disclosed are compounds of the class of 1-alkoxy-1-aryl-2,3-butadienes, e.g., 2-(4'-biphenylyl)-2-methoxy-3,4-pentadiene, which are useful by reason of their pharmacological activity in animals, e.g., as anti-inflammatory agents. Said compounds can be prepared by etherification of a corresponding 1-aryl-2,3-butadien-1-ol.

10 Claims, No Drawings

1-ALKOXY-1-ARYL-2,3-BUTADIENES

The invention relates to 1-alkoxy-1-aryl-2,3-butadienes and to pharmaceutical compositions and method utilizing the pharmacological activity of said compounds.

The compounds of the present invention can be represented by the formula I

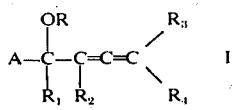

wherein

R is lower alkyl, e.g., having from 1 to 3 carbon atoms, and is preferably methyl, $R_1$ is a hydrogen atom or alkyl or 1 to 3 carbon atoms, $R_2$ is a hydrogen atom or methyl, and $R_3$ and $R_4$ are, independently, a hydrogen atom or alkyl of 1 to 3 carbon atoms, provided that at least one of $R_3$ and $R_4$ is a hydrogen atom when $R_2$ is methyl; and A is either a substituted phenyl group of the formula A1:

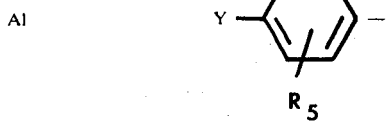

wherein $R_5$ is a hydrogen atom or halo having an atomic weight of from about 19 to 80, i.e., fluoro, chloro or bromo;

Y is halo having an atomic weight of from about 80 to 127, i.e., bromo or iodo, isobutyl, tert.-butyl, cyclohexyl, cyclohexyl, e.g., cyclohex-1-enyl, or substituted or unsubstituted phenyl of the formula:

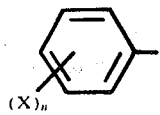

X is a hydrogen atom, halo having an atomic weight of from about 19 to 80, i.e., fluoro, chloro or bromo, or lower alkoxy, e.g., having from 1 to 4 carbon atoms; and n is an integer from 1 to 5, preferably n is 1 or 2; or Y is an amino radical of the formula:

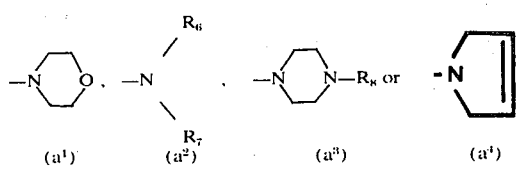

wherein each of $R_6$ and $R_7$, independently, is alkyl having 1 to 3 carbon atoms, or $R_6$ and $R_7$ are joined to form with the nitrogen atom an unsubstituted pyrrolidino or piperidino ring, and $R_8$ is a hydrogen atom or alkyl having 1 to 3 carbon atoms; or A is a naphthyl group of the formula A2:

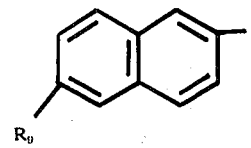

wherein $R_9$ is hydrogen, halo having an atomic weight of from about 19 to 80, i.e., fluoro, chloro, bromo, lower alkyl, e.g., of 1 to 4 carbon atoms, lower alkoxy, e.g., of 1 to 4 carbon atoms, lower alkylthio, e.g., of 1 to 4 carbon atoms, or difluoromethoxy.

In the definitions of A1 and A2 above, the terms alkyl, alkoxy and alkylthio, having from 1 to 3 or 4 carbon atoms, include groups having as the hydrocarbyl portion thereof methyl, ethyl, propyl or butyl, including isomeric forms where such exist, but are preferably unbranched.

The Compounds I therefore include 2 classes of compounds, i.e., Compounds IA1 and IA2 which may be represented by the formulas:

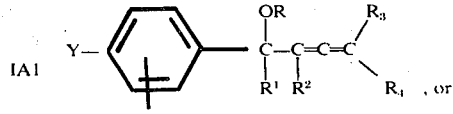

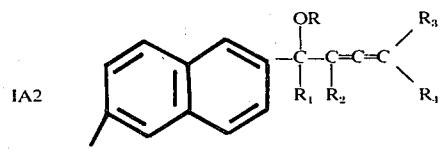

wherein R, $R_1$, $R_2$, $R_3$, $R_4$, $R_5$, $R_9$ and Y are as defined above.

Compounds I may be prepared by etherification of the hydroxy group of a corresponding compound of formula II,

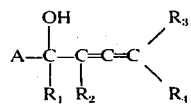

wherein A, $R_1$, $R_2$, $R_3$ and $R_4$ are as defined above, with an etherifying agent (III) of the formula:

R-Z    III wherein

R is as defined above, and

Z is a nucleofugal leaving group, e.g., a halogen atom having an atomic weight of from 35 to 127, i.e., chloro, bromo or iodo, tosylate, or $-O-S-O_3-CH_3$.

The etherification reaction may be carried out in the conventional manner for etherifying, i.e., alkylating, a secondary or tertiary aliphatic hydroxy group. For example, the etherification reaction may be carried out under anhydrous basic conditions, in a suitable inert solvent, at a temperature of from −10° to +60°C. The basic conditions may be provided by a strong base of the formula

M-B, wherein

B is lower alkoxy, e.g., having from 1 to 6 carbon atoms, such as methoxy, ethoxy, propoxy, butoxy, pentoxy or hexoxy and their isomeric forms, or the anion $-NH_2$, $-H$ or $-CH_2SO-CH_3$, and the like; and M is an alkali metal, e.g., Na or K.

Particularly suitable solvents are t-butanol or dimethyl sulfoxide; however, where the etherifying agent is liquid under the reaction conditions, excess etherificating agent may serve as solvent. It is preferred to employ the etherifying agent in excess, alternatively in such a large excess that it serves as solvent, i.e., reaction medium, e.g., of the order of from about 10 to 200 fold excess. In preparing Compounds I where R is methyl, a preferred etherifying agent is methyl iodide (iodomethane). Preferred temperatures are 0° to +20°C.

Starting materials and reactants described above, e.g., Compounds II, are known and obtainable by methods described in the literature, e.g., the Belgian Pat. No. 792,079 or where not known, they may be prepared in a manner analogous to that described for the preparation of known compounds.

Particularly preferred compounds I, are those wherein any of R or $R_1$ is methyl, $R_2$, $R_3$ or $R_4$ is a hydrogen atom or A is an unsubstituted biphenylyl radical.

The compounds of formula (I) are useful because they possess pharmacological activity in animals. In particular, the compounds (I) are useful as anti-inflammatory agents as indicated by the Carageenan induced edema test on rats (oral administration at 1 to 200 mg/kg). For such use, the compounds may be combined with a pharmaceutically acceptable carrier, and such other conventional adjuvants as may be necessary, and administered orally in such forms as tablets and capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 1 milligram to about 250 milligrams per kilogram, e.g., from about 1 milligram to about 175 milligrams per kilogram of body weight, preferably given in divided doses 2 to 4 times a day, or in sustained release form. For most mammals, the administration of from about 100 milligrams to about 3000 milligrams, e.g., from about 160 milligrams to about 2000 milligrams, of the compound per day provides satisfactory results and dosage forms suitable for internal administration comprise from about 25 milligrams to about 1500 milligrams, e.g., from about 40 milligrams to about 1000 milligrams, of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for manufacture or pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert diluent, e.g., calcium carbonate, calcium phosphate, kaolin, polyethylene glycol, peanut oil or sesame oil. The preferred pharmaceutical compositions from the standpoint of preparation and ease of administration are solid compositions, particularly tablets and solid or liquid diluent-filled capsules, as appropriate to the nature of the particular active ingredient.

When the substituent Y is an amino radical, then such compounds (I) may be similarly administered in the form of their non-toxic pharmaceutically acceptable acid addition salts. Such salts do not materially differ from the free base in their pharmacological effects and are included within the scope of the invention. The acid addition salts are readily prepared by reacting the base with pharmacologically acceptable acids in conventional manner. Representative of such salts are the mineral acid salts such as the hydrochloride, hydrobromide, sulfate, phosphate and the like and the organic acid salts such as the benzoate, acetate, maleate, fumarate, p-toluenesulfonate, benzenesulfonate and the like.

Representative formulations for administration, 2 to 4 times a day, in treating inflammation are liquid-filled, soft gelatin capsules prepared by conventional techniques and containing the following:

| Ingredient | Weight in Milligrams |
|---|---|
| 2-(4'-biphenylyl)-2-methoxy-3,4-pentadiene | 50 |
| peanut oil or sesame oil | 170 |

In the following examples which are illustrative of the invention, temperatures are in degrees centigrade, and room temperature is 20 to 30°C., unless indicated otherwise.

EXAMPLE 1

2-(4'-biphenylyl)-2-methoxy-3,4-pentadiene.

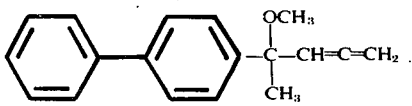

To a solution of 2-(p-biphenylyl)-3,4-pentadien-2-ol in 60 ml. of iodomethane at 5°C. under nitrogen, is added 125 ml. of a 15% t-butanol solution of potassium t-butoxide. The mixture is poured onto ice. The resulting mixture is extracted 3 times with 30 ml. portions of chloroform. The combined chloroform extracts are dried over anhydrous magnesium sulfate, filtered, and the filtrate evaporated under reduced pressure to yield an oil. The oil is chromatographed on a silica gel G column to yield the title compound, using benzene-pentane as an elutant.

Repeating the procedure of this example, but replacing the 2-(p-biphenylyl) 3,4-pentadien-2-ol with an approximately equivalent amount of the compound of column A there is similarly obtained the compound of column B.

| A | B |
|---|---|
| a) 2-(p-tert.butyl-phenyl)-3,4-pentadien-2-ol | a) 2-(p-tert.butyl-phenyl)-2-methoxy-3,4-pentadiene |
| b) 2-(p-bromophenyl)-3,4-pentadien-2-ol | b) 2-(p-bromophenyl)-2-methoxy-3,4-pentadiene |
| c) 2-(p-cyclohexyl-m-chlorophenyl)-3,4-pentadien-2-ol | c) 2-(p-cyclohexyl-m-chlorophenyl-3,4-2-methoxy-pentadiene |
| d) 2-(p-isobutyl-phenyl)-3,4-pentadien-2-ol | d) 2-(p-isobutyl-phenyl)-2-methoxy-3,4-pentadiene |
| e) 2-(p-biphenylyl)-3,4-heptadien-2-ol | e) 2-(p-biphenylyl)-2-methoxy-3,4-heptadiene |
| f) 2-(p-1'-cyclo-hexenylphenyl)-3,4-pentadien-2-ol | f) 2-(p-1'-cyclo-hexenylphenyl)-2-methoxy-3,4-pentadiene |
| g) 2-(p-morpholino-phenyl)-3,4-pentadien-2-ol | g) 2-(p-morpholino-phenyl)-2-methoxy-3,4-pentadiene |
| h) 2-[p-(N-methyl-piperazinyl)phenyl]-3,4-pentadien-2-ol | h) 2-[p-(N-methyl-piperazinyl)phenyl]-2-methoxy-3,4-pentadiene |
| i) 2-(p-3-pyrrolinyl-phenyl)-3,4-pentadien-2-ol | i) 2-(p-3-pyrrolinyl-phenyl)-2-methoxy-3,4-pentadiene |

EXAMPLE 2

Repeating the procedure of Example 1, but using in place of the iodomethane (methyl iodide) used therein, an approximately equivalent amount of ethyl iodide or n-propyl bromide, there is similarly obtained 2-(4'-biphenylyl)-2-ethoxy-3,4-pentadiene, or 2-(4'-biphenylyl)-2-n-propoxy-3,4-pentadiene.

EXAMPLE 3

Repeating the procedure of Example 1, but replacing the 2-(4'-biphenylyl)-3,4-pentadien-2-ol used therein with appropriate starting materials in approximately equivalent amount, there is similarly obtained:

a. 1-(6'-methoxy-2'-naphthyl)-1-methoxy-2,3-butadiene,
b. 2-(2'-naphthyl)-5-methyl-2-methoxy-3,4-hexadiene,
c. 2-(2'-naphthyl)-2-methoxy-3,4-heptadiene,
d. 2-(2'-naphthyl)-2-methoxy-3,4-pentadiene,
e. 3-(6'-methoxy-2'-naphthyl)-6-methyl-3-methoxy-4,5-heptadiene,
f. 3-(6'-methoxy-2'-naphthyl)-3-methoxy-2,6-dimethyl-4,5-heptadiene,
g. 3-(6'-methoxy-2'-naphthyl)-2-methyl-3-methoxy-4,5-hexadiene,
h. 3-(6'-methoxy-2'-naphthyl)-3-methoxy-4,5-hexadiene,
i. 2-(6'-chloro-2'-naphthyl)-5-methyl-3-methoxy-3,4-hexadiene,
j. 2-(p-isobutylphenyl)-5-methyl-2-methoxy-3,4-hexadiene,
k. 2-[p-(4'-methoxyphenyl)-phenyl]-2-methoxy-3,4-pentadiene,
l. 1-(p-biphenylyl)-1-methoxy-2,3-butadiene,
m. 2-(p-biphenylyl)-5-methyl-2-methoxy-3,4-hexadiene,
n. 2-[p-(4'-chlorophenyl)-phenyl]-2-methoxy-3,4-pentadiene,
o. 3-(p-biphenylyl)-3-methoxy-4,5-hexadiene,
p. 2-[p-(4'-fluorophenyl)-phenyl]-2-methoxy-3,4-pentadiene, and
q. 2-(p-cyclohexylphenyl)-2-methoxy-3,4-pentadiene.

What is claimed is:

1. A compound of the formula:

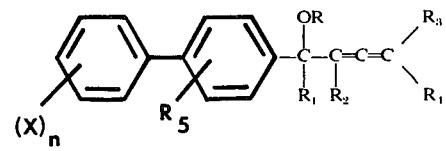

wherein

R is alkyl having form 1 to 3 carbon atoms;

$R_1$ is a hydrogen atom or alkyl of 1 to 3 carbon atoms;

$R_2$ is a hydrogen atom or methyl;

$R_3$ and $R_4$ are, independently, a hydrogen atom of alkyl of 1 to 3 carbon atoms, provided that at least one $R_3$ and $R_4$ is a hydrogen atom when $R_2$ is methyl;

$R_5$ is a hydrogen atom or halo having an atomic weight of from about 19 to 80;

X is a hydrogen atom, halo having an atomic weight of from about 19 to 80, or alkoxy having from 1 to 4 carbon atoms; and n is an integer from 1 to 5.

2. A compound of claim 1 wherein R is methyl.
3. A compound of claim 1 wherein $R_1$ is methyl.
4. A compound of claim 1 wherein $R_2$, $R_3$ and $R_4$ are each a hydrogen atom.
5. A compound of claim 1 wherein X is a hydrogen atom.
6. A compound of claim 1 wherein $R_2$ is a hydrogen atom.
7. A compound of claim 6 wherein $R_5$ is a hydrogen atom.
8. A compound of claim 7 wherein n is one.
9. The compound of claim 8 which is 2-[p-(4'-methoxy-phenyl)-phenyl]-2-methoxy-3,4-pentadiene.
10. The compound of claim 8 which is 2-(4'-biphenylyl)-2-methoxy-3-4-pentadiene.

* * * * *